Figure 1:
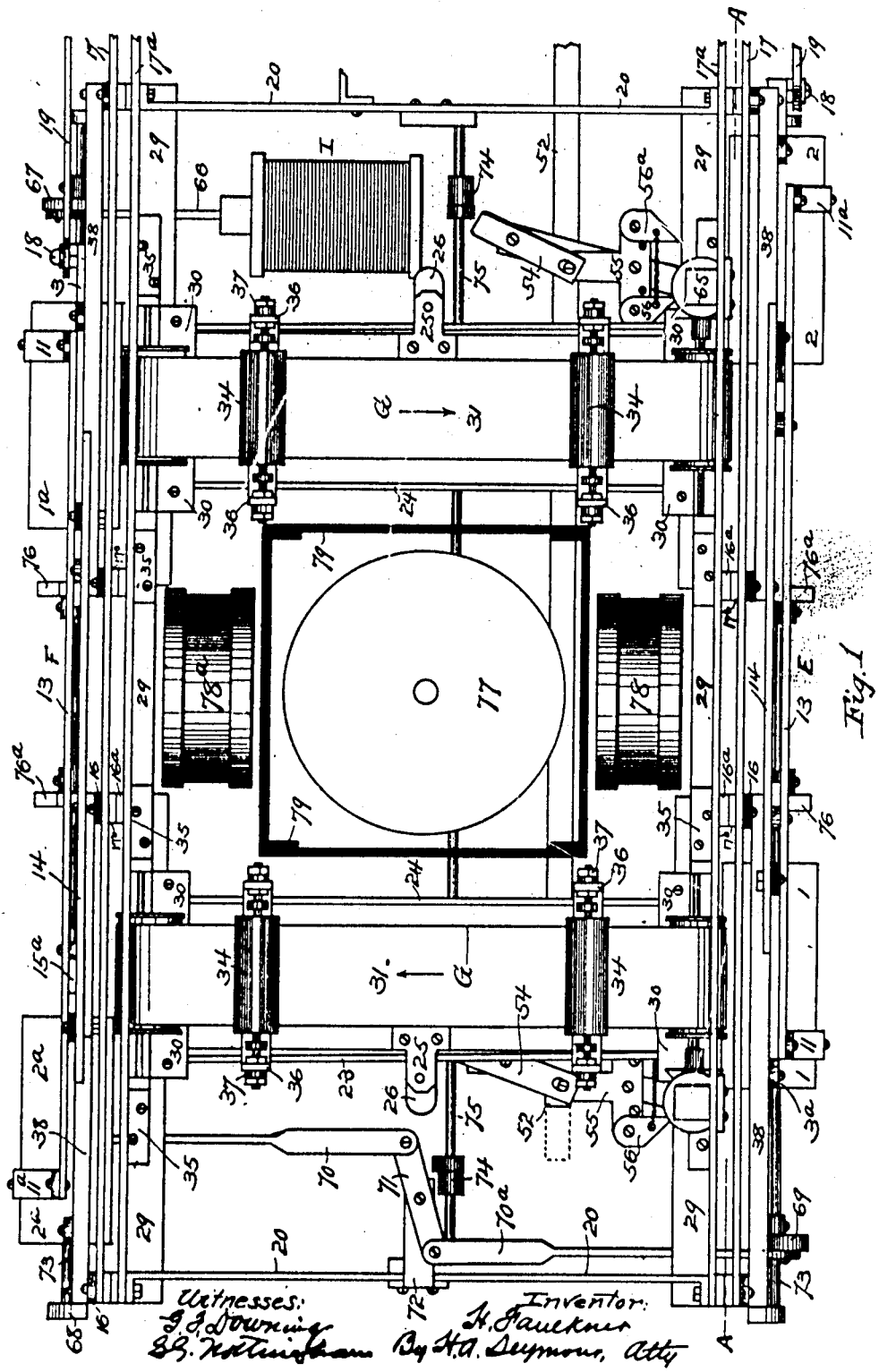

H. FAULKNER.
PHOTOGRAPHIC APPARATUS.
APPLICATION FILED NOV. 17, 1909.

1,013,286.

Patented Jan. 2, 1912.
11 SHEETS—SHEET 1.

Witnesses:
Inventor:
H. Faulkner
By H. A. Seymour, Atty

H. FAULKNER.
PHOTOGRAPHIC APPARATUS.
APPLICATION FILED NOV. 17, 1909.

1,013,286.

Patented Jan. 2, 1912.
11 SHEETS—SHEET 6.

Witnesses:
Inventor:
H. Faulkner

H. FAULKNER.
PHOTOGRAPHIC APPARATUS.
APPLICATION FILED NOV. 17, 1909.

1,013,286.

Patented Jan. 2, 1912.
11 SHEETS—SHEET 9.

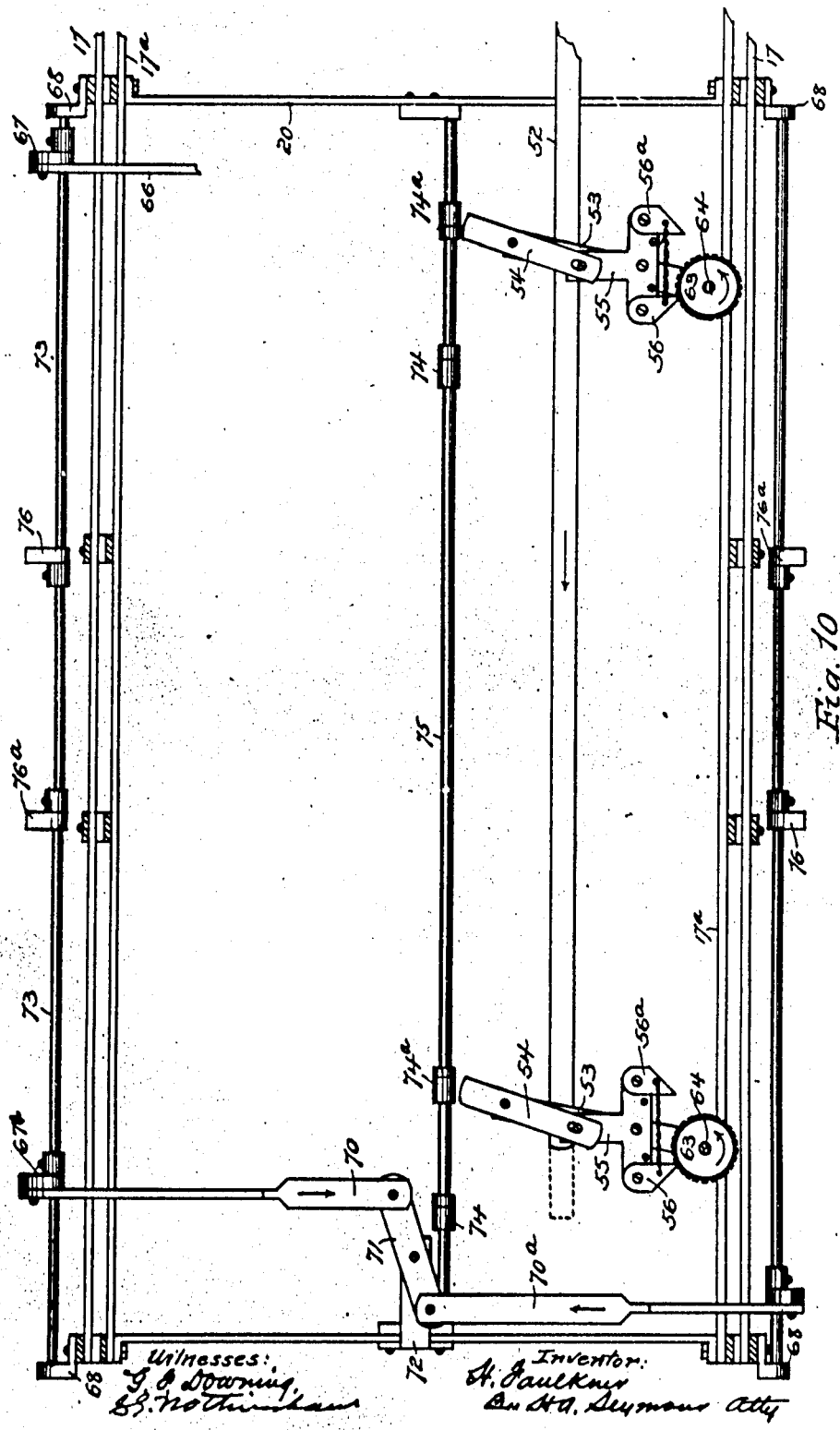

H. FAULKNER.
PHOTOGRAPHIC APPARATUS.
APPLICATION FILED NOV. 17, 1909.
1,013,286.
Patented Jan. 2, 1912.
11 SHEETS—SHEET 11.
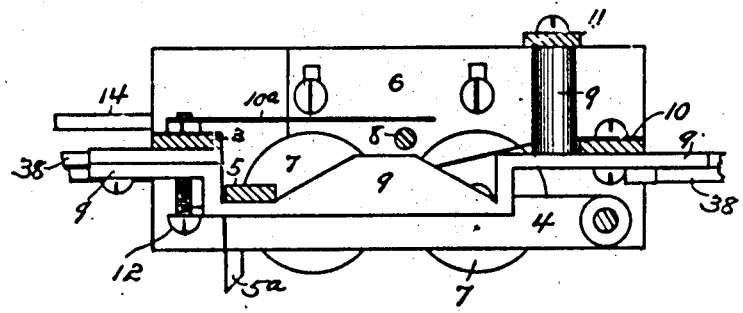
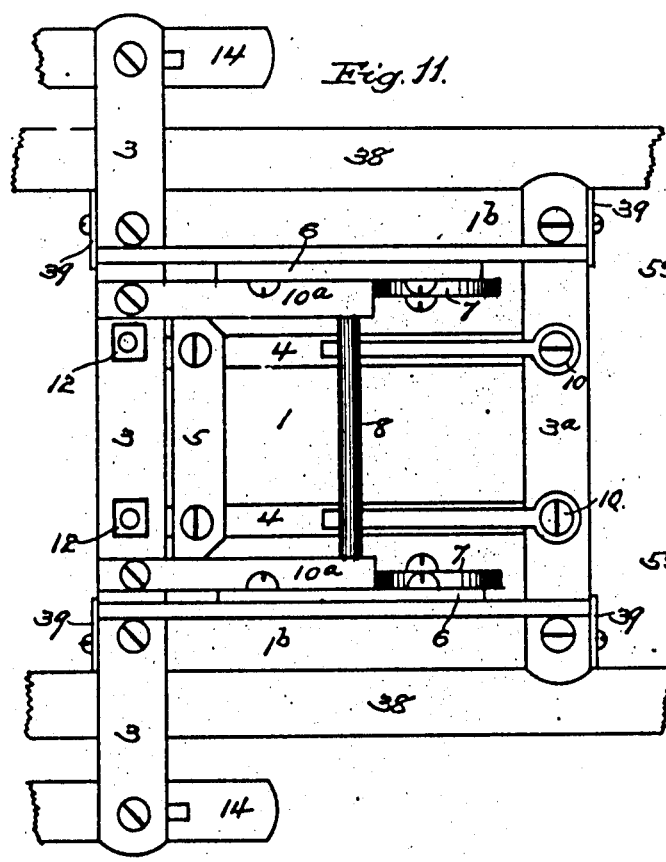
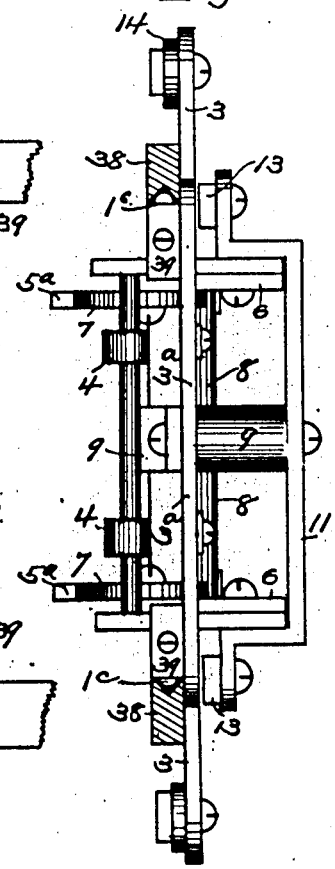

UNITED STATES PATENT OFFICE.

HERMAN FAULKNER, OF SALT LAKE CITY, UTAH.

PHOTOGRAPHIC APPARATUS.

1,013,286.           Specification of Letters Patent.        Patented Jan. 2, 1912.

Application filed November 17, 1909. Serial No. 528,538.

*To all whom it may concern:*

Be it known that I, HERMAN FAULKNER, of Salt Lake City, in the county of Salt Lake and State of Utah, have invented certain new and useful Improvements in Photographic Apparatus; and I do hereby declare the following to be a full, clear, and exact description of the invention, such as will enable others skilled in the art to which it appertains to make and use the same.

This invention relates to improvements in photographic plate changing mechanism for taking moving pictures and continuous projection thereof by the aid of photographic plates, and more particularly to means for handling and progressively feeding photographic plates, cut films or other plate material.

One object of the invention is to provide a machine of the character described which shall be adaptable for feeding plates progressively in quick succession for making or for projecting so called moving pictures by the aid of photographic plates or cut films, or for exhibiting, in more or less rapid succession, prints, plates or cards.

A further object is to construct the machine in such manner that it can be adapted for use in feeding automatically various quantities of plates, films or prints, conveying the same intermittingly and successively from one magazine to another and back again, so that they may thus be caused to travel in a continuous circuit through the magazines and be exposed or subjected to the influence of light during their transit from one magazine to another.

A further object is to so construct the machine in such manner that it can be adapted for use in feeding a limited number of plates, films or prints, conveying the required number of the same from one magazine to another, and be automatically operated to reverse the feeding of the plates in the magazines, conveying the same plates in reverse order back to their original positions in the starting magazine,—and that the machine may automatically make these changes and cause the plates to travel in "see-saw" fashion.

A further object is to so construct a machine of the character specified that it can be made to feed or handle the plates either in "see-saw" fashion or continuously in the same direction and to provide electrical means for automatically reversing the operation of the feeding means.

A further object is to so construct a machine of the character described that it may be accurate, rigid and effective in its movements, displaying or feeding plates in like manner from either side of the machine,—thus projecting a limited number of plates or cut films from both sides of one source of light on two screens at the same time, so that an almost unlimited number of changes may be shown on two screens by one source of light with a limited number of slides within the magazines.

A further object is to so construct a machine for feeding plates or cut films, that the machine can be operated in series of two or more machines of its kind to enable duplex or multiplex projection, and when two or more plates are to be projected on the screen in coincident positions upon the screen and a series of machines are operating or projecting images intermittingly from each head or source of light,—with the pictures arranged in one machine so that one will project the even numbers of the series and the other the odd numbers of the same series of animated pictures, the result being duplex projection.

A further object is to so construct the machine that it shall be adaptable for feeding a limited number of plates progressively and, by the employment of a metal or "dummy" plate, to automatically reverse the feed and change the direction of travel of the contents of the magazines,—thus causing a series of pictures to travel in one direction when projected on the screen (by multiplex projecting) and seen to build up an advertisement or animated image, while if the machines be reversed, the pictures will move in the opposite direction and produce a tearing down effect.

With these and other objects in view the invention consists in certain novel features of construction and combinations of parts as hereinafter set forth and pointed out in the claims.

Figure 2:
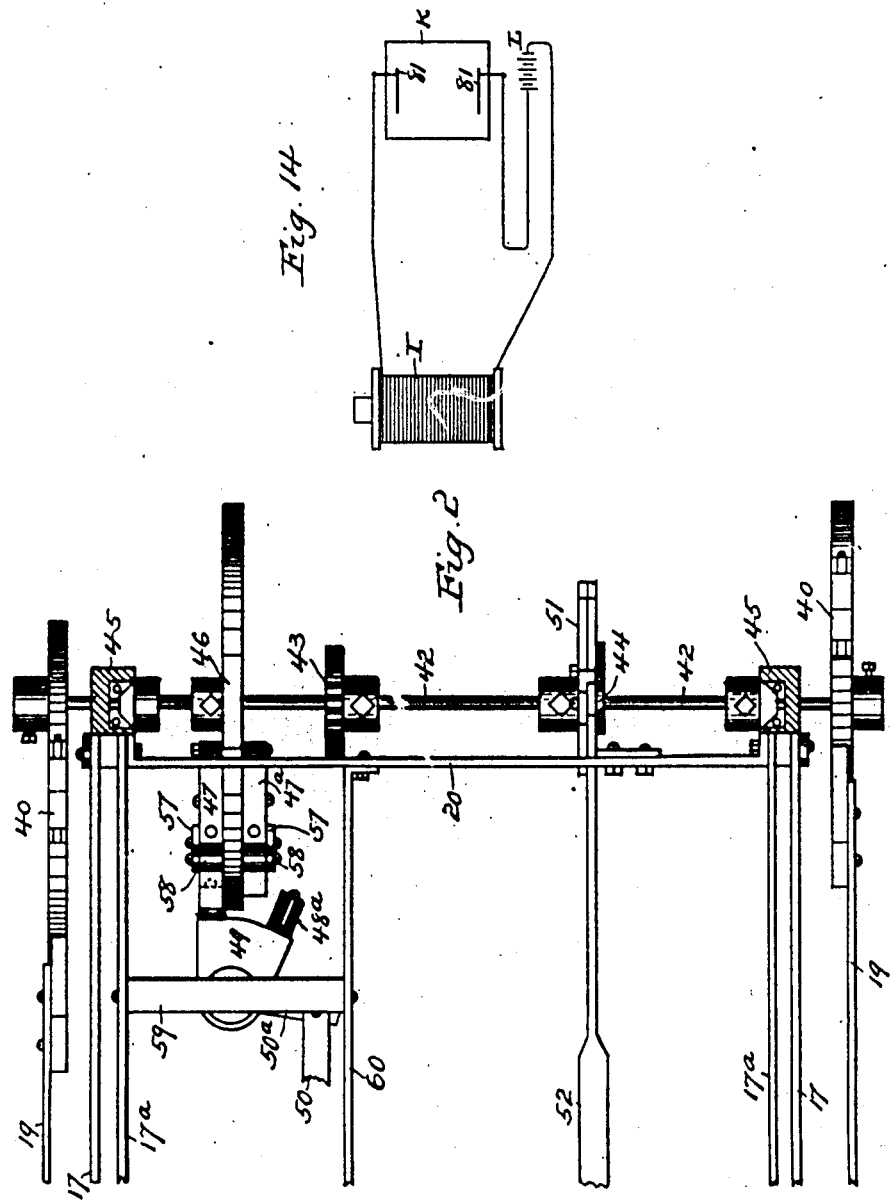
Figure 3:
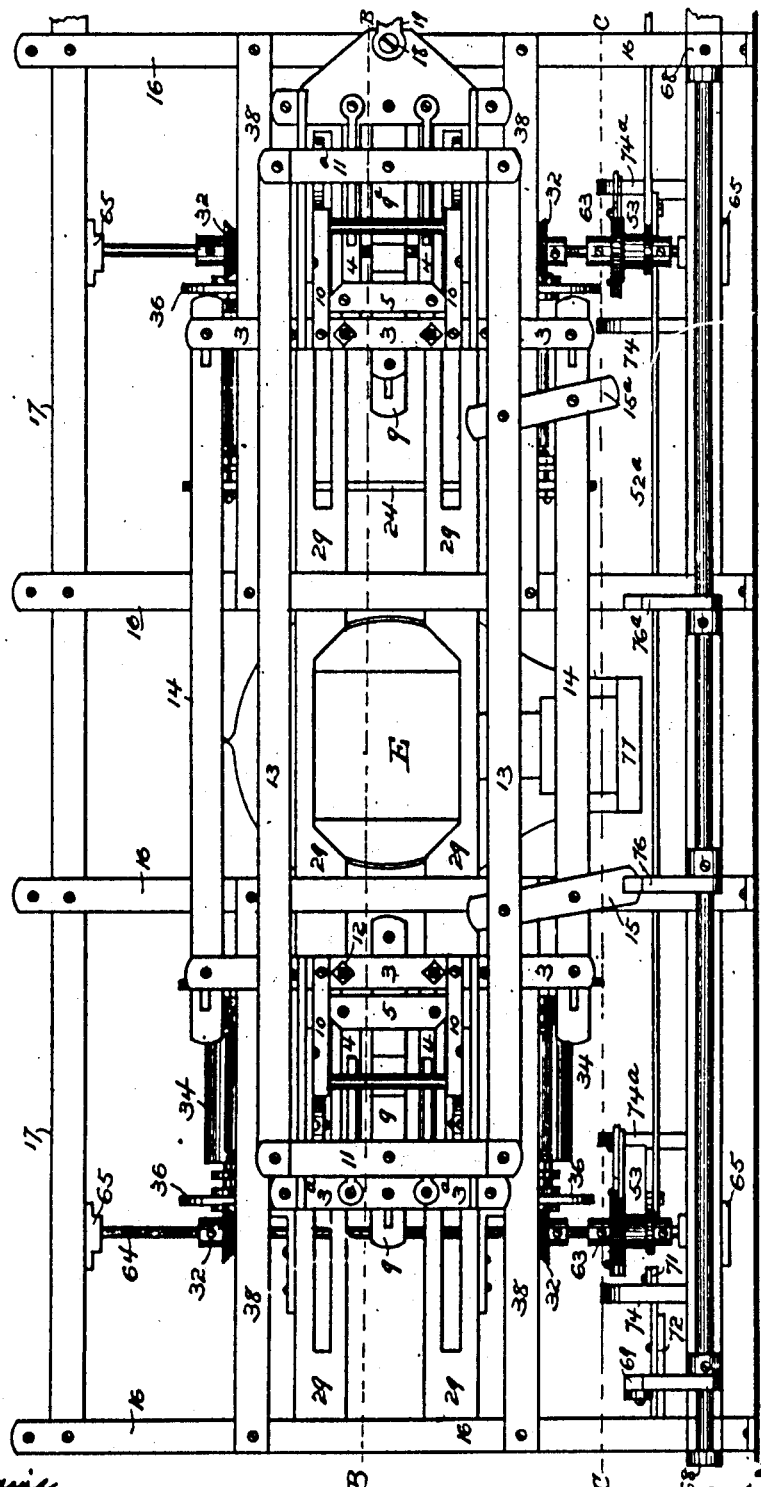
Figure 4:
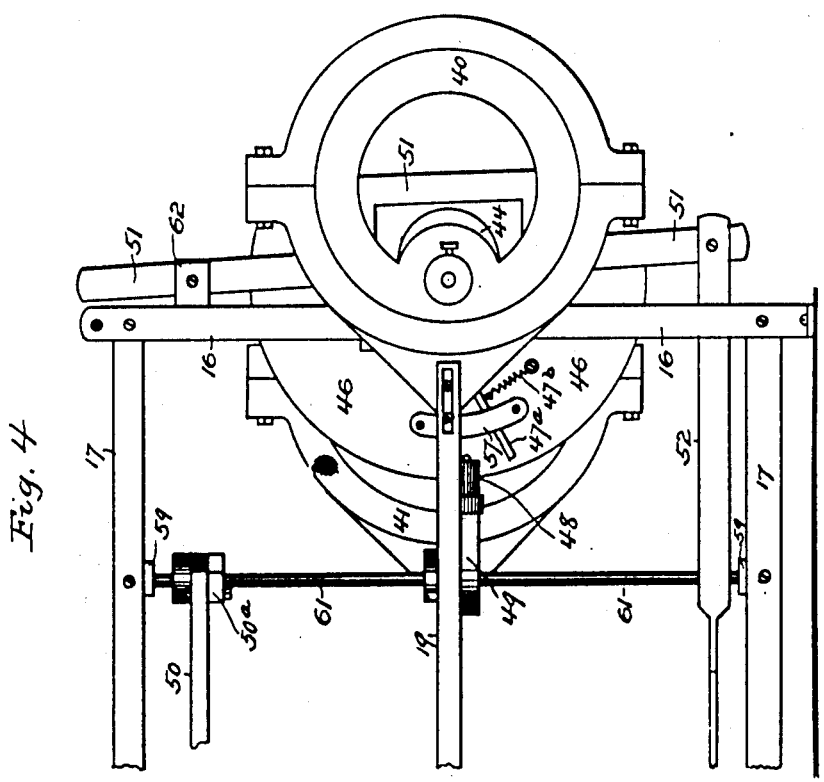
Figure 5:
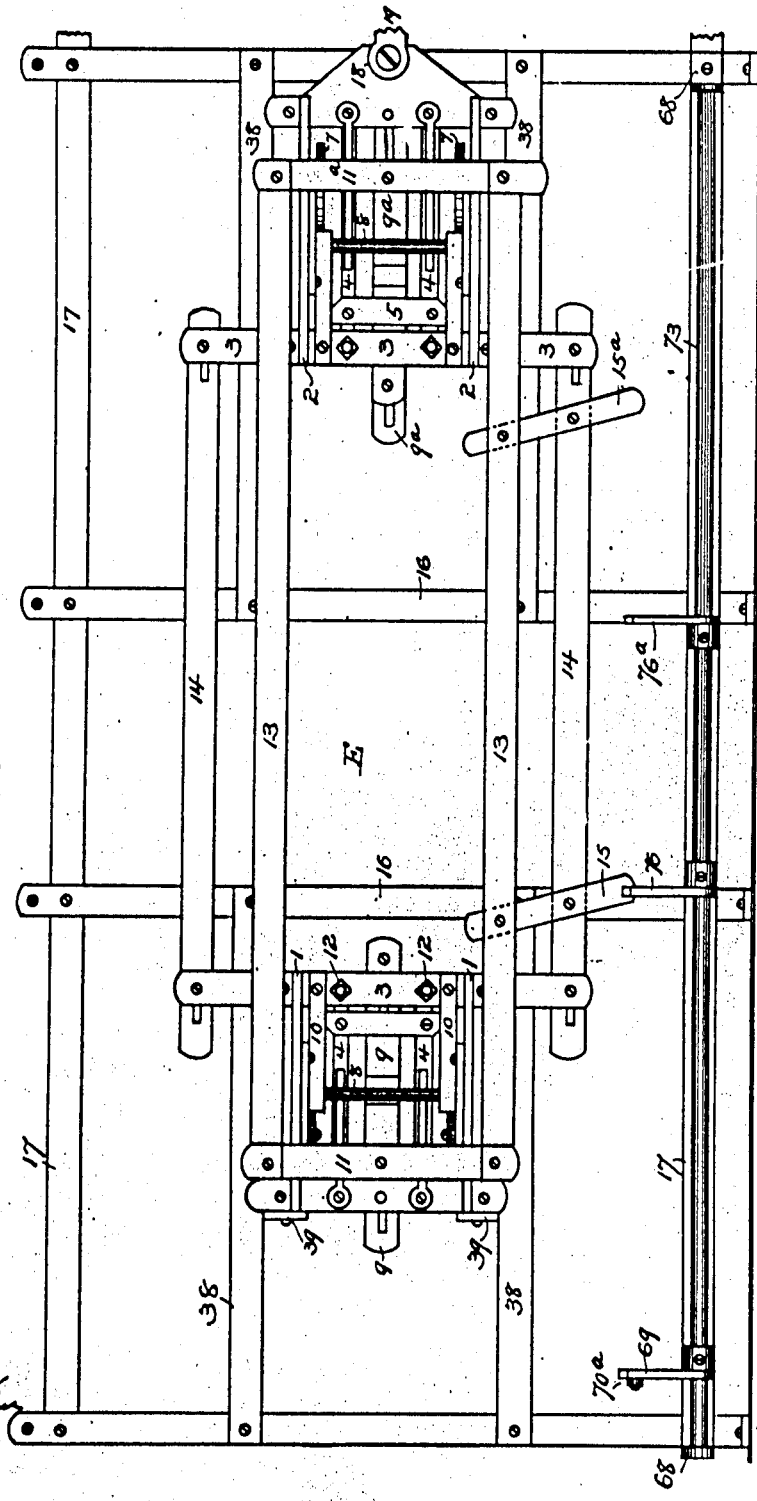
Figure 6:
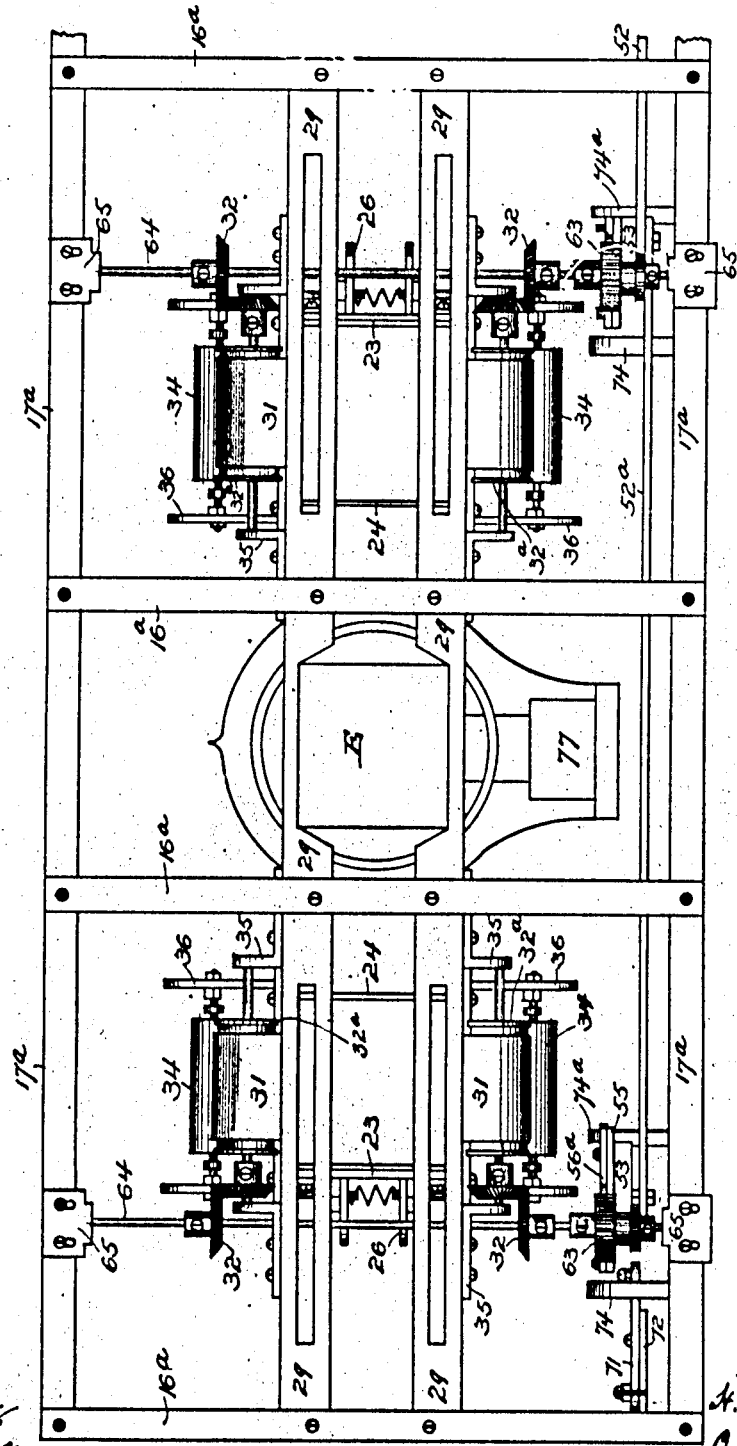
Figure 7:
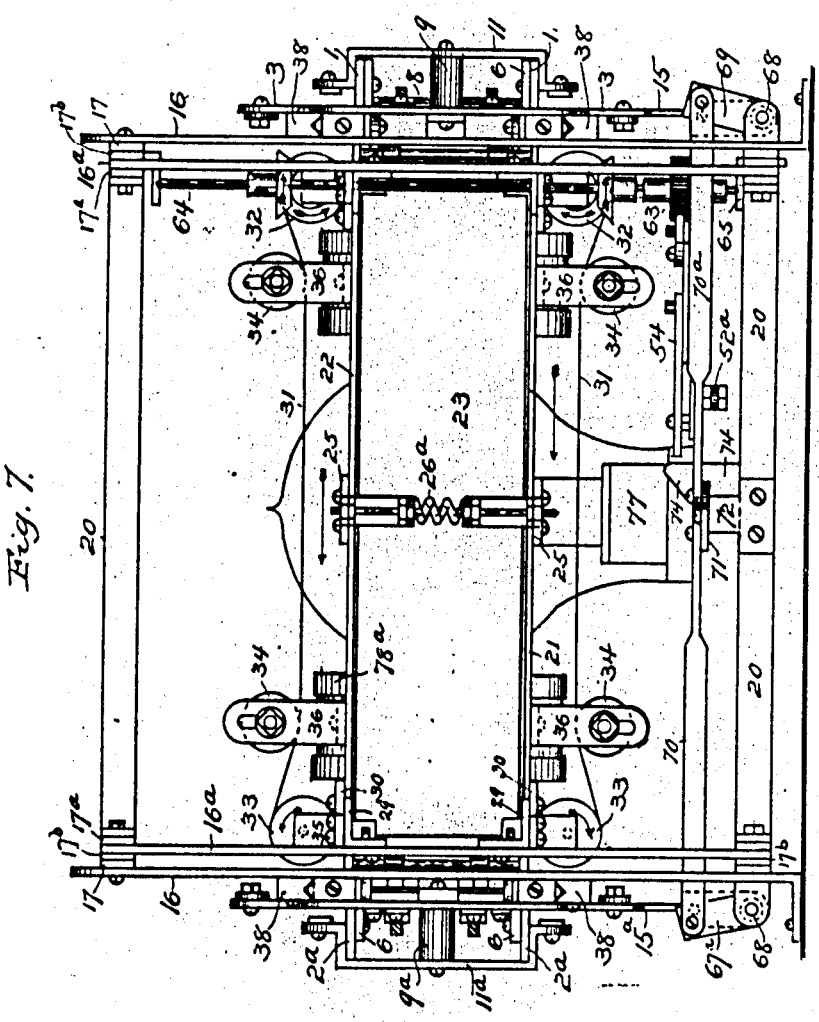
Figure 8:
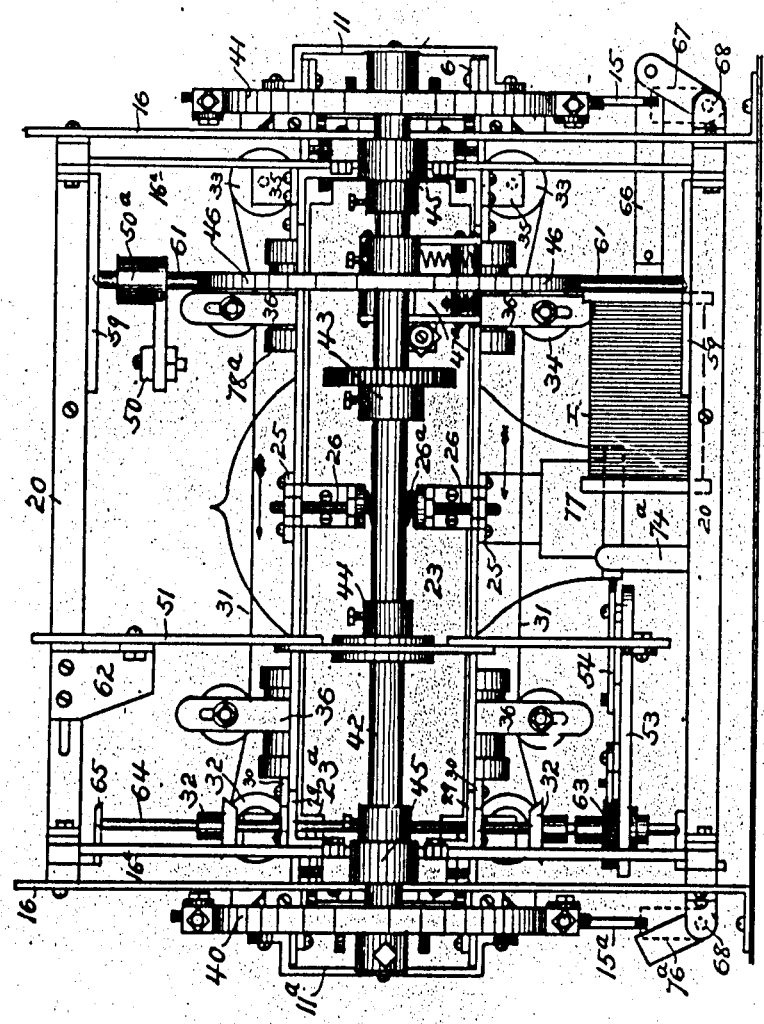
Figure 9:
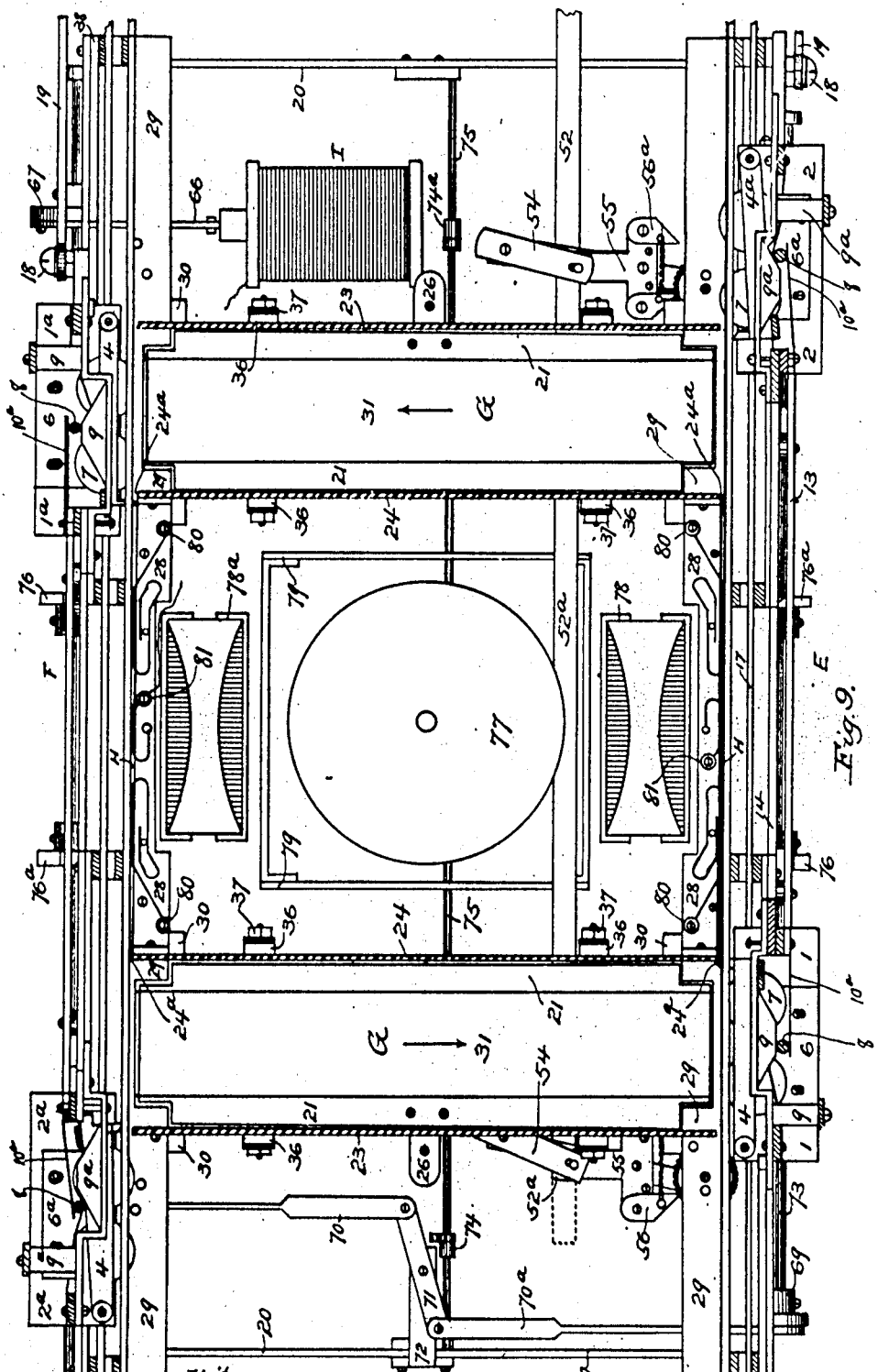

In the accompanying drawings,—Figures 1 and 2 are views which, when read together, constitute a plan of a machine embodying my invention,—Fig. 1 embracing the feeding mechanism and magazines and Fig. 2 showing the means whereby power is applied for driving the mechanism. Figs. 3 and 4 constitute a rear elevation of the machine,—the front elevation differing therefrom only in that the driving eccentric and parts operated thereby would appear in reverse positions to those shown in Figs. 3 and 4 and that the front elevation would not show the power gear feeding devices for the magazine belt conveyers. Fig. 5 is a rear elevation showing only such parts as appear outside of the line A—A of Fig. 1. Fig. 6 is a view in elevation showing only such parts as appear inside of the line A—A of Fig. 1. Fig. 7 is a left end elevation showing parts contained in the machine to the left of the axis of the light. Fig. 8 is an end elevation showing the driving mechanism and those parts contained in the machine to the right of the axis of light. Fig. 9 is a horizontal cross-section on the line B—B of Fig. 3,—this section giving an unobstructed view of the path of travel of the plates as well as the positions of the parts of the shuttles when feeding plates in a continuous circuit. Fig. 10 is a horizontal cross-section of the base of the machine on the line C—C of Fig. 3, showing the positions and connections of the automatic reversing fingers and pitmen as they appear on the machine when not engaged and when the circuit of the electrical devices is open. Fig. 11 is a front elevation of a shuttle when operated as a propelling shuttle,—the shifting frame 13—11—9 being omitted that an unobstructed view of the shuttle proper may be had. Fig. 12 is an outer end elevation of the shuttle when operated as a propelling shuttle and embracing the parts of the shifting frame 13—11—9 as shown in Figs. 3 and 5, and Fig. 13 is a horizontal cross-section of the shuttle on the line B Fig. 3. Fig. 14 is a diagrammatical view showing the circuit of the solenoid I and contact brushes 81.

The entire mechanism, with the exception of the objective lenses (not shown) may be employed in a light tight casing. However, where a suitable lamp house 79 is placed about the light within the machine, as shown in Fig. 1, the machine may operate for projecting pictures. By this arrangement, overheating of the plates and the machine will be prevented and if the machine be used as a magazine plate camera, it will be necessarily in a light tight box, with the exception of the camera lens.

The machine comprehends an automatic plate feeding structure comprising a frame carrying two trapezoidal magazines systematically placed with respect to each other; means for conveying the plates through the magazines parallel with each other and parallel to the planes of raceways; two parallel raceways at right angles to the inner ends of the magazines and serving as guides for the plates during their travel in train fashion from one magazine to the other at both front and rear of said magazines; two windows or openings, one in each raceway, at which the plates are exposed or exhibited; means for conveying the plates from the delivery ends of the magazines through the raceways and accurately centering them at the windows, and means for conveying the plates from the raceways into the receiving ends of the magazines. The machine also comprehends the reversing of the feeding mechanism, which will cause the reverse action of those parts which feed the plates within the magazines as well as within the raceways and thereby reverse the direction of travel of the plates in the raceways and magazines; two outwardly tilting magazine walls that will adjust themselves to conform to the travel of the plates and thus reverse the trapezoidal positions of the magazines; two pairs of interchangeable and reversible shuttles that are so placed that when acted upon, reverse the feeding of the plates from the ends of the magazines into the raceways; two pairs of reversible magazine belt feeding mechanisms that control the magazine belts and when acted upon, reverse the direction of belt action within the magazines. Three vibrating pitmen and adjustable tappet fingers thereon are provided to operate in the path of the reverse levers of the shuttle and ratchet gear mechanism, at such time as the circuit of the electrical devices is closed by the feeding of a " dummy " metal plate to the axis of the window within a race-way. Two pairs of spring contacts or brushes are provided adjacent to the raceway windows for the purpose of forming by coöperation with a " dummy " metal plate, circuit closing means.

In the construction of the frame work of the machine, I employ two pairs of vertical front and rear frames, each comprising a series of five uprights 16 and 16ᵃ and horizontal upper and lower longitudinal beams 17 and 17ᵃ connecting the uprights, the two frames thus formed being bound together by bolts passing through the uprights 16 and 16ᵃ, and the horizontal beams 17 and 17ᵃ at their crossings. Between each of the frames are spacers or washers 17ᵇ to hold the frames apart slightly. The front and rear frames are connected by cross beams or braces 20 as shown in Figs. 1, 2, 7 and 8. The two intermediate uprights 16 and 16ᵃ of the respective frames are so spaced apart that windows or openings E and F are formed between them and between the central and end uprights 16 and 16ᵃ of the respective frames, two horizontal magazines G, G, are disposed transversely of the frame work and these magazines communicate at both ends with raceways H, H, through which plates are to be passed from one magazine to the other and presented, during such passage, at the windows or openings E and F as will be more fully hereinafter explained.

Each magazine G comprises side walls 23 and 24 and can be made trapezoidal in shape by pivotally mounting the outer sidewall 23 of each machine as shown at 26. The object of the trapezoidal shape of the magazines and the tilting outer wall is to provide a wider mouth at the ends where plates are being received than at the delivery ends of the magazines, and the tilting outside walls 23 of the magazines allow the automatic reversal of this by the plates, according to the direction in which the plates are moving. The central pivot hinge 26 of the outer magazine wall 23 allows the receiving end of the magazine to be automatically changed to a delivery end when the feeding of the plates in the machine is reversed, and by this change, the plates will not wedge at the end of the magazine when the operation of the feeding devices is being reversed. The tilting side wall 23 of the magazine permits a free and proper position of the plates at the end of the magazine whether they are being received from the raceways or delivered thereto. The two magazines are identical in construction and hence a detailed description of one will suffice for both.

Each magazine comprises a floor 21, top or ceiling 22 and sides 23 and 24. The side or wall 23 is hinged at the center of the magazine by means of a sliding bolt 26 passing through a plate 25 and this construction will permit the said wall 23 to tip either in or out as the case may be and form the trapezoidal shape of the magazine when the latter is filled with plates,— it being understood that when the machine is operated to pass plates in front of the windows E and F in the two raceways H and to make the travel of plates to follow a continuous circuit through the magazines and raceways, a sufficient number of plates should be employed to fill both magazines so that when a plate is discharged from one end of a magazine, another plate will enter the opposite end of the same magazine and thus keep the latter filled. The outer wall 23 is made with notches 23$^a$ at its corners to allow rollers on the shuttles to freely pass. Both ends of the outer wall 23 are the same in construction and are not connected to any part of the machine but are supported and held in place solely by the pin 26 engaging the plate 25. Furthermore, the wall 23 of each magazine forms a door which enables the changing of the plates into the magazines and is so mounted that it may be removed by depressing the hinge pins 26 toward the center against the resistance of springs 26$^a$ and out of contact with the plates 25. The inner wall 24 of each magazine is bolted to a guide-plate 28 resting on a horizontal angle piece 29 of the adjacent raceway and at right angles to the plane of said raceway. The walls 24 are somewhat shorter than the walls 23 and thus form small gateways or openings 24$^a$ communicating with the raceways. The floor 21 and ceiling 22 of each magazine connect with the angle piece 29 by resting upon a cross-plate 30 bolted to said angle piece. The ends of the floor plates 21 and the ceiling plates 22 intermesh slightly with the angle pieces 29 of the raceways and provide for a free movement of conveying belts 31 in passing in and out of the ends of the magazines, as shown in Fig. 9.

As shown in Fig. 6, the two longitudinal angle raceway pieces 29 are secured to uprights 16$^a$ with their inside members projecting toward the axis of the machine and forming floors and ceilings for the raceways H, while the vertical members of said angle pieces 29 form the outer walls of said raceways. The upper and lower angle pieces 29 are identical in construction and, with the guide plates 28 (Fig. 9) form the guideways or raceways H connecting the ends of the magazines. Raceway tension springs 80 are secured to the plates 28 and bear against the outer walls of the raceways so as to press the plates against said outer walls when said plates travel through the raceway and become disposed between said springs 80 and the outer wall of the raceway,—the plates being in this manner prevented from vibration.

The vertical member of each angle piece or strip 29 is slotted where the same passes the end of a magazine to facilitate the movement or travel of shuttles pawls 5 and rollers 7 and permit the same to properly engage the plates for feeding the latter. The plates are fed from the magazines to the raceways and made to bear against the outer wall or side of the angle strips or pieces 29,—said plates being fed through the magazines G by frictional contact with two conveyer belts 31 as shown in Figs. 6 and 7. These belts pass over rollers 32$^a$ and 33 having their journals mounted in hangers 35 and the latter may be secured to the angle pieces 29. It will be observed in Figs. 6, 7 and 9 that the belts 31 enter the magazines at the ends and pass over both floor 21 and ceiling 22 at their juncture with the angle strips or pieces 29. Idlers 34 are provided for the belts 31 and have their journals mounted in bearings 37 secured to brackets 36 supported by the floor and ceiling members of the magazines. It is apparent that by adjusting the idlers 34 in the brackets 36, the belts 31 may be tightened or loosened as occasion may require.

Between the lamp 77 in the center of the machine and the windows E and F, light condensers 78—78ª are located and supported in any suitable manner.

It has been hereinbefore explained that the plates are fed from a magazine to a raceway and the mechanism will now be described by means of which the plates are moved successively to a raceway, exposed at the windows E and F therein and then moved to the receiving end of the other magazine to be discharged thereinto, conveyed therethrough and then passed through the other raceway, exposed at the window therein and finally returned to the receiving end of the first magazine. For moving the plates forwardly in the raceways as said plates enter the latter from a magazine, I employ reciprocating shuttles 1 and 2 adapted to engage the rear edges of the plates only long enough for each rear edge of a plate to move slightly beyond the inner face of the inner wall 24 of the magazine,—the plate being impelled the remaining distance through the raceway to the receiving end of the other magazine by the advancing edge of the next succeeding plate and the latter being impelled by the next succeeding stroke of the same shuttle. The mechanisms at both front and rear of the machine are the same, thus rendering a detailed description of both unnecessary, and as the plates are discharged from one end and received by the other end of each magazine, the connections for operating the devices which cause the passage of plates through the raceways will be such that the action of the shuttles 1 and 2 at one side of the machine will be exactly the same as the shuttles 1ª and 2ª at diametrically opposite corners of the plate circuit at the other side of the machine. When the machine is in operation, an odd number of plates (three when as shown in Fig. 6) will be in each raceway. The sweep of the shuttles (Figs. 3 and 4) will be the same as the throw or sweep of eccentric 40—41 and connecting arms 19.

Strips or guides 38 having grooves (Figs. 3, 7 and 12) forming bearings for balls 1ᶜ, are provided for the accommodation of the shuttles 1 and 2. These strips or guides 38 are attached to standards 16 of the outer framework and their grooved portions disposed opposite each other above and below the shuttles. Each shuttle comprises two members or grooved guide plates 1ᵇ, 1ᵇ (Fig. 11) connected together by strips 3 and 3ª bolted near their ends and having their grooves disposed to accommodate the balls 1ᶜ, which latter are located between said strips 38 and the guide plates 1ᵇ. At each end of each member or strip 1ᵇ of the shuttle, a plate or clip 39 is secured to retain the balls 1ᶜ in place. The shuttles are connected with each other by means of two horizontal beams 14 which are adjustably connected with the strips 3 of the shuttles as shown in Fig. 5 so that said shuttles can be adjusted with respect to each other and to properly propel the plates and center them at the windows E—F. Arms or links 4 are pivotally interposed between the bearing blocks or members 1ᵇ of the shuttle with their journals mounted in the ends of the blocks near the standards 3ª (Fig. 13) and to these arms a pawl plate 5 is attached, as shown in Fig. 11. The plate 5 is provided with pawls or projections 5ª (Figs. 12 and 13) to engage the rear edges of the plates as they come from the magazines when the machine is operating. The pawls 5 are thrust inward by means of flat springs 10 which bear against the arms 4, and to prevent the pawls of plate 5 entering too far into the mouth of a magazine, governors or stop pins 12 (Figs. 11 and 13) are employed to adjust and check the sweep of arms 4. Thus the pawls 5ª of plate 5 may be allowed to extend into a magazine just the proper distance to carry out at one time, the plate to be impelled into the raceway. In each shuttle, I employ a pair of feed rollers 7 supported by plates 6 which are connected with each other by a pin or bolt 8, as shown in Figs. 11, 12 and 13. The plates 6 are freely mounted between the bearing blocks or members 1ᵇ by means of suitable pins or headed screws. The feed rollers 7 will be thrust into the mouth of the receiving end of a magazine when the shuttle is receiving plates and after said shuttle has been converted into a roller feeder, by pressure of springs 10ª secured to the strip 3 of the shuttle, on pin 8 secured to the plates carrying said feed roller 7. See Fig. 9. It will be understood that each shuttle is convertible; that is, the action and work of each shuttle may be changed by means of reversing devices so that the pawls 5ª may be in position to impel plates out of the mouth of the magazine and the rollers in said shuttle be held out of action or out of the path of said plates, or may be adjusted to form a roller feeder to discharge plates into the other magazine and have its pawls 5ª out of operative position. The results above described are attained by means of a shifting frame comprising members 9, 11, 11ª and 13,—said frame or shifting device entering and being connected with each pair of shuttles (as shown in Figs. 3, 5 and 9) in such manner that when the shuttles 1 and 1ª are impelling plates out into the raceway, the shuttles 2 and 2ª are feeding the incoming plates at the opposite ends of their strokes, into the mouths of the other magazines. It is therefore apparent that no single shuttle can have in action both the pawls 5ª and the feed rollers 7 at the same time, but that either the pawls 5ª are in operative position and the rollers 7 out of operative position or vice versa. Furthermore, as shown in Fig. 9, the shuttles 1 and 1ª stand with their pawls in action and their rollers out of action. Shuttles 2 and 2ª are shown in Fig. 9 as converted to roller feed shuttles with the rollers adapted to feed the incoming plates into a magazine and out of the path of succeeding plates in the raceway. From an inspection of Fig. 9, it will be observed that shuttles 1 and 1ª are impelling shuttles while shuttles 2 and 2ª are adjusted to form roller feed shuttles. I will therefore explain the operation of the shuttles as adjusted in Fig. 9 of the drawings and later explain the means employed for reversing and thus converting the work and action of said shuttles. As one of the shuttles (say the shuttle 1) at its forward sweep has moved a plate by means of the pawls 5ª toward the opposite magazine, the shuttle 2 has also moved forwardly in advance of the incoming or moving plate and serves the purpose at this time, of holding the contents of the magazine far enough into the latter to keep a clear path into the magazine for the advancing plate by means of the projecting roller 7 acting or resting against the face of the plate which has been previously received at the receiving end of the magazine. With the machine as shown in Fig. 9, shuttles 1 and 1ª are impelling plates by means of pawls 5ª and shuttles 2 and 2ª are receiving plates. The machine as shown in Fig. 9 will cause the plates to travel in such manner as to make a complete circuit, said plates leaving one end of one magazine, passing through a raceway and entering the other magazine, through which they will travel and enter the other raceway and, after passing through the latter enter the opposite end of the first mentioned magazine.

The various shuttles are the same in construction and can be reversed automatically as to their action on the plates by means of devices which will now be explained.

It may be assumed that there are "dummy" metal plates K within each magazine and that these, together with the photographic plates, will fill the magazine. The machine is then operated in the manner indicated in Fig. 9 of the drawings. The travel of the plates would be in a continuous circuit through the magazines G and raceways H until such time as a "dummy" metal plate reaches a position in the raceway in front of a window E (or F), when said "dummy" plate will make contact with contact springs or brushes 81. Two such brushes 81 are employed in front of each window E and F and these brushes are included in a normally open circuit with a solenoid I and a suitable source L of electrical energy, so that when a metal plate reaches the contact brushes 81, it will connect them and thus close the circuit which includes the solenoid, thereby energizing the latter as shown in Fig. 14. The core of the solenoid is connected with a bar or pitman 66, the latter being connected with and adapted to cause the operation of devices which effect the reversal of the shuttle action, as hereinafter explained. The reversal of the action of the shuttles is to be obtained at the instant the forward edge of the metal plate comes into contact with the brushes 81 in the raceway, and means are also provided, under the control of the metal "dummy" plate and its coöperating electrically controlled devices, for reversing the feeding of the plates in the magazines at the same instant that the actions of the shuttles are reversed. By converting shuttles 1 and 1ª to form roller shuttles and converting shuttles 2 and 2ª to form propelling or feeding shuttles, the rollers 7 of the shuttles 1 and 1ª will be forced inward and the pawls 5ª moved out of the path of the plate travel and thus the shuttles 1 and 1ª are no longer propelling but are roller or receiving shuttles. At the same instant that the shuttles 1 and 1ª are transformed into receiving shuttles, the shuttles 2 and 2ª are converted into feeding shuttles.

The shifting means for reversing the action of the shuttles comprises members 15—15ª, 13—11—11ª—9 and 9ª, shown in Figs. 3 and 5. The tappet levers 15 and 15ª are for the purpose of operating the shuttle shifting devices and these tappet levers are actuated by engagement with fingers 76 and 76ª adjustably mounted on the shaft 73. Shaft 73 is mounted in hangers 68, there being two such shafts, one at each side of the machine and each of said shafts is provided with the fingers 76 and 76ª disposed below the respective windows E and F. The shafts 73 are connected and operated in unison so that each pair of fingers on each side of the machine may move inwardly to engage the tappet levers 15 or 15ª of the shifting frames which connect the shuttles. When the shafts 73 have been moved so that the fingers thereon will become disposed in the path of the tappet levers, one or the other of said tappet levers will engage one of the fingers as the connected shuttles move in the same direction in the raceways and cause the tappet levers which thus engage fingers on the shafts 73 to be oscillated and thereby transmit motion to the bars 13 and consequently to the members 11 on the shuttles and the wedges 9 to effect the reversal of the action of the shuttles. The solenoid hereinbefore referred to is connected through the medium of the pitman 66 with an arm 67 on one of the shafts 73 for oscillating the latter. This shaft is also provided with an arm 67ª and the latter is connected with the other shaft 73 for transmitting motion to the latter by means of devices which will now be described.

An arm 72 is secured to the framework at one end thereof and to this arm a lever 71 is pivotally connected between its ends. One end of the lever 71 is connected by means of a rod or pitman 70 with the arm 67ᵃ on one of the shafts 73, while the other arm of the lever 71 is connected by means of a rod or pitman 70ᵃ with an arm 69 on the other shaft 73. From this construction it is apparent that when the solenoid is actuated, motion will be transmitted to both of the shafts 73 and that the pairs of fingers carried by these shafts below the respective windows E and F will be moved simultaneously to effect the reversing of the various shuttles simultaneously through the medium of the shifting devices hereinbefore described. With the arrangement of the devices as above described, the shuttles will be converted or changed in form just previous to the delivery of a metal "dummy" plate to the window E or F.

In order to reverse the direction of travel of the belts 31 which feed the plates through the magazines, simultaneously with the reversal of the action of the shuttles, I provide a shaft 75 provided near one end with an arm 74 disposed under one arm of the lever 71 and this shaft is also provided with another arm 74 and with arms 74ᵃ. When the shafts 73 are oscillated and the lever 71 is turned as above described, said lever will engage the arm 74 adjacent to it and cause the shaft 75 to be turned a sufficient distance to cause the arms thereon to become disposed in the path of tappet levers 54. These tappet levers are pivotally supported by arms 53 on a rod or pitman 52 and are connected with ratchet plates 55 also supported by the arms 53 and carrying dogs 56 to engage ratchet wheels connected with the gearing 63 by means of which the belts 31 are driven. It is apparent that when the rod or pitman 52 is reciprocated, motion will be transmitted to the belt gearing and that this motion will be continuous in the same direction as long as one pawl 56 on each ratchet plate 55 is coöperating with the gearing. It is apparent however that if the ratchet plates be so shifted as to move the pawls 56 out of operative relation with the belt gearing and move the pawls 56ᵃ into operative relation with said gearing, the direction of travel of the magazine belts will be reversed and therefore the movement of the plates through the magazines will also be reversed. This reversal of travel of the magazine belts will occur simultaneously with the reversal of the action of the shuttles, by reason of the operation of the shaft 75 to move the arms thereon in position to effect the shifting of the ratchet mechanism of the belt driving means, such operation of the shaft being effected primarily by the action of the solenoid which operates the shafts 73 to effect the reversing of the shuttles when the circuit of said solenoid is closed by the appearance of a metal "dummy" plate in the raceway between two contact brushes 81.

The form of shuttles being convertible and the feed belts in the magazines being reversible, it is apparent that the plates may be propelled from one magazine and by the aid of the metal "dummy" plate at the end of a series of photographic plates, when propelled to the window E, will close the circuit of brushes 81 and the solenoid to operate the bar or pitman 66 and the devices connected therewith and controlled thereby, and thus return the series of plates to the starting magazine instead of carrying them through the complete circuit of the two magazines and raceways as previously described. Thus, plates may be made to "see-saw" or travel in zigzag fashion within the raceways. This is desirable where a limited number of plates may be employed,—in which case it would be well to use a suitable spacer block or "dummy" to fill the portions of the magazines which have not been used by the photographic plates. This spacer block should be just the proper size to prevent the plates being manipulated from tipping over or tilting too much in the magazines.

Having explained the purpose of the shifting or reversing devices of the machine, I will now explain what changes and manner of movements would take place should the bar or pitman 66 be actuated prior to the full sweep of the shuttles 1 and 1ᵃ.

It will be understood from Figs. 1, 3, 5 and 9 of the drawings, that the shuttles 1 and 1ᵃ are adjusted to propel plates in the respective magazines and have reached their full sweep, having propelled a plate entirely out of the delivery end of each magazine and slightly beyond the edge of the inner wall thereof. In the event that the bar or pitman 66 (Figs. 1, 9 and 10) be drawn inward at a time previous to the shuttles 1 and 1ᵃ having completed their stroke or at such time that the tappet levers 15 and 15ᵃ are outside of the line of action of the fingers 76 and 76ᵃ (Figs. 3, 5 and 9), the machine may obtain a reverse feed,—the following movements taking place: Starting with the arm or bar 66, it may be assumed that the same has been actuated manually or otherwise as the shuttles 1 and 1ᵃ are propelling a plate into the raceways and before completing their strokes. The shafts 73 and their fingers 76 and 76ᵃ will be drawn inward instantly and at the same time standards or arms 74 and 74ᵃ on the shaft 75 will be thrust toward the belt feed gears 63.

Now just before the shuttles have completed their sweeps toward the windows E and F, the tappet levers 15 on each side of the machine will engage the fingers 76, and as the shuttles and shifting frame move onward, the lever 15 will be forced back, giving an additional forward motion to the shifting frames (comprising parts 13, 11 and 11$^a$) far enough to move the inclined faces of the sliding plates or members 9$^a$ within the shuttle frame of shuttles 2 and 2$^a$ and at the same time advancing sliding plates 9 within the shuttles 1 and 1$^a$. This action of the two pairs of sliding wedge plates 9 and 9$^a$ converts the shuttles as follows, prior to completing the sweep of the shuttle frames. The shuttles 1 and 1$^a$ have been changed from propelling shuttles to roller or receiving shuttles, while the shuttles 2 and 2$^a$ have been changed to propelling shuttles. These changes take place in unison and to prevent the locking up of the machine, the feed mechanism for the magazine contents must be released and then reversed and this is accomplished by the action of the lever 71 in its coöperation with an arm 74 on the shaft 75 to shift the ratchet mechanism which actuates the feed belts 31 in the magazines as previously explained. Thus it will be seen that the engagement of a lever 54 with a standard or arm 74$^a$ (Fig. 10) while the connecting rods 52 are moving ratchet arms 53 toward the source of power, causes the plate 55 to release the pawls 56 from engagement with the ratchet wheels 63 and at the same stroke of movement of the levers 54 and ratchet plates 55, the ratchet pawls 56$^a$ are made to bear against the ratchet wheels 63 of the conveyer belt gearing. When the pawls 56 are engaging the wheels 63 the arms 53 are moved through connecting rods 52 by a cam 44 and its reciprocating cross-head 51 toward the left end of the machine (see dotted lines in Figs. 1 and 9). The pawls 56 will give an intermittent motion to the wheels 63 and belt gearing 32 in the direction indicated by arrows in Figs. 7 and 10. If the pawls 56$^a$ be engaged with the wheels 63, said pawls will ride over the teeth of said wheels as the arms 53 move to the left and at the next sweep of the cam 44, the cross-head 51 will sweep back the arms 53 to positions shown in Figs. 1, 9 and 10 and in so moving, cause the pawls 56$^a$ to intermesh with the wheels 63 and actuate the same and the gears 32 in the opposite direction to that indicated in Figs. 7 and 10. By the shifting of the pawls 56 and 56$^a$, the gears 63 and 32 will stand idle while the cam 44 is making one-half revolution and during the other half revolution of the cam, the gearing will be actuated to begin the motion of the conveyer belts 31. It will be seen that the contents of the magazines G are not moved appreciably in any direction while the shifting of ratchet mechanism and converting of the shuttles are taking place. The shuttle action as well as the feed of the conveyer belts 31 having been reversed, the plates 70 within the raceways H will be moved so as to return the "dummy" metal plates in the raceways from their positions at E or F toward the magazine or magazines from which the metal plate or plates had been previously propelled, thus opening the electric circuit of the solenoid and releasing the bar or pitman 66 and parts controlled thereby. For the intermittent movement of the plates, as in moving picture work, the machine may be operated to pass the plates at a window E or F at a rapid rate of speed without a great amount of vibration of the machine or plates.

The shuttles 1 and 2 also 1$^a$ and 2$^a$ receive motion from the eccentrics 40 and 41 on a power shaft 42. The eccentric 41 (Figs. 2 and 4) is provided with a cross-head and with a link 19 pivotally connected with the shuttle 2 at 18 (Figs. 3 and 5) so that said link will reciprocate as the eccentric 41 is rotated by the shaft 42, thus furnishing a smooth reciprocating motion to the shuttles 1 and 2. The shuttles 1$^a$ and 2$^a$ are similarly connected with and receive motion from the shaft 42. When power is applied (from any convenient source) to a gear 43 keyed to shaft 42, the eccentrics 40 and 41 will give reciprocating motion to the shuttles 1 and 2 and 1$^a$ and 2$^a$. The shaft 42 is supported by ball-bearing hangers 45 and in Fig. 2 a portion of said hangers is cut away to show the arrangement of shaft, cones and balls. In Figs. 2, 4 and 8 the cam or eccentric 44 and cross-head 51 are installed to operate the intermittent feed of the belt gearing 63 and 32.

With the construction and arrangement hereinbefore described, the feeding of the plates will be practically continuous, but for taking or projecting pictures as in moving picture work, the feed should be intermittent. For accomplishing this, the devices now to be described may be employed.

A disk 46 is secured to the power shaft 42 and provided on respective faces with escapement pallets 47 and 47$^a$. The pallets are pivotally attached to the disk and are guided by links 57, said pallets being normally maintained in proper position by means of springs 47$^b$. At the ends of the guide links, rubber buffers 58 for the plates, are located. A shaft 61 is mounted between bars 59 secured to the parts 17$^a$ and 60. An escapement lug 49 is secured to the shaft 61 and provided with two rollers 48—48$^a$ to coöperate with the pallets 47 and 47$^a$ on the disk 46. An arm 50$^a$ is also secured to the shaft 61 and to this arm, a rod 50 is attached and is connected with any suitable timing device, not shown, for operating the escapement lug 49 to control the intermittent motion of the shaft 42, by the coöperation of the rollers 48—48ª with the pallets 47 and 47ª on the disk 46. The escapement mechanism thus formed for causing the intermitting rotation of the power shaft, is designed to overcome vibration and snapping noise. The two rollers 48 and 48ª on the lug 49 are preferably made of compressed fiber or leather to deaden the noise when the disk flies around and the two vibrating pallets strike the rollers. The buffers or cushions 58 may also be of hard leather to deaden the noise. The two tension springs 47ᵇ at the center of the pallets overcome the force of the release as well as to pull down the pallet that may not be engaged with the rollers 48 or 48ª as the case may be.

It will be observed that the form of escapement above described permits the disk to make a complete revolution at each impulse or vibration of arm 50—50ª.

With my improvements, it will be seen that, owing to frequent changes of the feeding mechanism controlled by the electrical devices through the medium of the metal "dummy" plate, a limited number of advertisements may be made to appear more often and in less time than were the plates containing such advertisements caused to make the complete circuit through the machine.

Numerous slight changes might be made in the details of construction of my machine without departing from the spirit of my invention or limiting its scope and hence I do not wish to restrict myself to the precise details herein set forth.

Having fully described my invention what I claim as new and desire to secure by Letters-Patent, is,—

1. In a machine of the character described, the combination of means for moving and exposing plates successively, and means for reversing the direction of movement of the plates.

2. In a machine of the character described, the combination with means for moving plates successively and stopping them temporarily, of means for reversing the direction of travel of the plates.

3. In a machine of the character described, the combination of means for moving plates in a continuous circuit, and means for reversing the direction of travel of said plates.

4. In a machine of the character described, the combination of means for moving plates successively and temporarily stopping them between the ends of their travel, and means operating automatically to reverse the direction of travel of said plates.

5. In a machine of the character described, the combination with two magazines and a raceway connecting them, of means for feeding plates through the raceway from one magazine to the other, and means for reversing the direction of travel of the plates.

6. In a machine of the character described, the combination with two magazines and a raceway connecting them, of means for feeding plates through the raceway from one magazine to the other, and means operating automatically to reverse the travel of the plates.

7. In a machine of the character described, the combination with two magazines and a raceway connecting them, of means for feeding plates through the magazines, means for moving the plates through the raceway, means for reversing the operation of said moving means, and means for reversing the operation of said feeding means.

8. In a machine of the character described, the combination with two magazines and a raceway connecting them, of means for moving the plates through the raceway, means for moving the plates in the magazines, and means operating automatically to reverse the operation of all of said plate moving means.

9. In a machine of the character described, the combination with two magazines and two raceways connecting the ends of the magazines, of means for moving plates in opposite directions through the respective raceways, means for moving plates in opposite directions through the respective magazines, and means operating automatically to reverse the operation of all of said plate operating means to reverse the direction of travel of the plates.

10. In a machine of the character described, the combination with two magazines and a raceway connecting them, of means for moving plates through the raceway from one magazine to the other, electrically actuated reversing means for the plate moving means, and circuit closing devices for the electrically actuated means.

11. In a machine of the character described, the combination with two magazines and a raceway connecting them, of means for moving plates through the raceway from one magazine to the other, electrically actuated reversing means for the plate moving means, and circuit closing devices for the electrically actuated means, a portion of said circuit closing devices being movable with the plates.

12. In a machine of the character described, the combination with two magazines and a raceway connecting them, of means for moving plates through the raceway from one magazine to the other, electrically actuated reversing means for the plate moving means, and means for automatically controlling said electrically actuated reversing means.

13. In a machine of the character described, the combination with two magazines and a raceway connecting them, of means for moving plates through the raceway from one magazine to the other, means for reversing the operation of said plate moving means, electrical devices for actuating the reversing means, contacts located in the raceway and included in a normally open circuit with the electrical devices, and a metal plate movable by the plate moving means and adapted to coöperate with said contacts to close the circuit of said electrical devices.

14. In a machine of the character described, the combination with two raceways, of a magazine communicating at its ends with said raceways and having one of its walls adjustable horizontally.

15. In a machine of the character described, the combination with two raceways, of a magazine communicating at its ends with the raceways, one wall of said magazine being hinged centrally as and for the purpose set forth.

16. In a machine of the character described, the combination with two raceways, of an adjustable trapezoidal magazine communicating at its ends with said raceway.

17. In a machine of the character described, the combination with two raceways having windows, of two magazines at respective sides of said windows and communicating at their respective ends with the respective raceways, the inner wall of each magazine being stationary, and means pivotally supporting the outer walls of said magazines centrally between their ends whereby either end of each magazine may be a receiving end or a delivery end for plates.

18. In a machine of the character described, the combination of two trapezoidal magazines and raceways connecting said magazines, and means for adjusting the magazines to contract the opening at one end and enlarge the opening at the other whereby the ends of said magazines may be adapted to receive plates from the raceways or deliver plates to the raceways according to the direction of travel of the plates through the raceways and magazines.

19. In a machine of the character described, the combination with two raceways, of a magazine connecting them, and means permitting the adjustment in width of the respective ends of said magazine.

20. In a machine of the character described, the combination with two raceways and a magazine connecting them, of conveyer belts for moving plates through said magazine, gearing for operating said conveyer belts, ratchet mechanism for operating said gearing, means for reversing said ratchet mechanism, and means for moving plates in the raceway.

21. In a machine of the character described, the combination with two raceways having windows and two magazines connecting said raceways at respective sides of the windows therein, conveyer belts for moving plates through said magazines, gearing for actuating said belts, ratchet mechanism for actuating the gearing, shuttles for moving plates through the raceways from one magazine to the other, and means for actuating said ratchet mechanism and reciprocating the shuttles.

22. In a machine of the character described, the combination with a raceway having a window and magazines communicating with said raceway at respective sides of said window, of conveyer belts for moving plates through said magazine, gearing for actuating the conveyer belts, ratchet mechanism for actuating the gearing to move the belts of the respective magazines simultaneously in opposite directions, means for reversing the operation of said ratchet mechanism, reciprocating shuttles for moving plates in the raceway, and means for reversing the action of said shuttles on the plates to reverse the direction of travel of the latter through the raceway.

23. In a machine of the character described, the combination with a raceway having a window and a magazine communicating with said raceway, of a convertible shuttle for moving plates from the magazine or to the magazine.

24. In a machine of the character described, the combination with a raceway having a window and a magazine communicating with said raceway, of a convertible shuttle for controlling the movements of plates in the raceway, and means for converting said shuttle to cause it to either feed plates from a magazine to the raceway window or from the raceway into the magazine.

25. In a machine of the character described, the combination with a raceway having a window and magazines communicating with said raceway at respective sides of the window, of convertible shuttles for controlling plates in the raceway, and means for simultaneously converting said shuttles, one into a propelling shuttle and the other into a receiving shuttle.

26. In a machine of the character described, the combination with a raceway having a window and magazines communicating with said raceway at respective sides of the window, of plate moving means for the magazines, convertible shuttles for moving plates in the raceway toward the window therein or for feeding plates from the raceway to the magazines, and means for simultaneously converting said shuttles and reversing the plate feeding means of the magazines.

27. In a machine of the character described, the combination with a raceway having a window and magazines communicating with said raceway at respective sides of the window, of shuttles for moving plates in the raceway, each of said shuttles provided with pawls to engage plates and move the same from a magazine toward the raceway window and each shuttle provided with means for receiving a plate and discharging it into a magazine and means for moving the propelling pawls of one shuttle out of action and for moving the receiving means of the same shuttle into action and for converting the other shuttle in reverse order.

28. In a machine of the character described, the combination with a raceway provided with a window and a magazine communicating with said raceway, of a reciprocating raceway shuttle provided with propelling pawls and with receiving rollers, and means for manipulating said pawls and rollers to move one into operative relation and the other out of operative relation to the plates.

29. In a machine of the character described, the combination with a raceway and a magazine communicating therewith, of a raceway shuttle for controlling plates in the raceway, said shuttle provided with a movable plate having pawls to engage and propel plates in the raceway, spring pressed rollers carried by said shuttle, and a wedge block movable in the shuttle for moving the pawl plate to render the pawls thereon inactive and for permitting said rollers to assume an operative position to receive a plate and discharge same into the magazine.

30. In plate feeding mechanism, the combination with a raceway, of a reciprocating shuttle frame, a movable pawl plate mounted in said frame, a movable roller frame mounted in the shuttle frame, rollers mounted in said roller frame, and means for moving the roller frame and pawl plate simultaneously for moving one into and the other out of operative position.

31. In plate feeding mechanism, the combination with a raceway, of a reciprocating shuttle frame, a spring pressed plate carrying pawls, a spring pressed roller frame mounted in the shuttle frame, rollers mounted in said roller frame, a wedge block to coöperate with the roller frame and pawl plate to move one into and the other out of action, means connected with the shuttle frame for reciprocating it, and means for operating the wedge block.

32. In plate feeding mechanism, the combination with a raceway having a window, of two reciprocating shuttle frames, a spring pressed pawl plate provided with pawls, mounted in each shuttle frame, a spring pressed roller frame mounted in each shuttle frame, rollers carried by each roller frame, a reciprocating frame, means carried by the reciprocating frame for moving the roller frames and pawl plates of the two shuttles, and means for operating said reciprocating frame.

33. In a machine of the character described, the combination with a raceway having a window and magazines connected with said raceway at respective sides of the window, of two convertible propelling and feeding shuttles to control the passage of plates through the raceway from one magazine to the other, means for converting said shuttles to reverse their action on the plates, an oscillatory shaft provided with arms to operate the shuttle converting means and electrically controlled means for automatically oscillating said shaft.

34. In a machine of the character described, the combination with a raceway having a window and magazines connected with said raceway at respective sides of the window, of two convertible propelling and feeding shuttles to control the passage of plates through the raceway from one magazine to the other, means for converting said shuttles to reverse their action on the plates, an oscillatory shaft provided with arms to operate the shuttle converting means, a solenoid connected with said shaft, contact brushes in the raceway and included in a normally open circuit with the solenoid, and a metal plate movable with the plates being fed to engage said contact brushes and close the solenoid circuit.

35. In a machine of the character described the combination with two raceways having windows, and two magazines communicating at their ends with said raceways at respective sides of the windows, of two convertible propelling and feeding shuttles for controlling the passage of plates through the raceways from one magazine to the other, conveying means for moving plates through the magazine, means for propelling the conveying means, means for converting the shuttles, two oscillatory shafts carrying arms to operate the shuttle converting means, connecting devices between the two oscillatory shafts, a third oscillatory shaft operated by said connecting devices, arms on said third shaft, and means operated by said last mentioned arms for reversing the propelling means for the plate conveying means of the magazines.

36. In a machine of the character described, the combination with a raceway having a window, and a shuttle for moving plates in said raceway, of a power shaft, a disk secured to said shaft, pallets pivoted to said disk, springs connected with the pallets, cushions for the pallets, a pawl plate having cushioned pawls to coöperate with said pallets and means for operating said pawl plate to cause an intermittent rotation of the power shaft.

37. In a machine of the character described, the combination with framework, of slotted members constituting one wall of a raceway, shuttles provided with means for moving plates in the raceway and adapted to project through the slotted members, and means for reciprocating the shuttles.

38. In a machine of the character described, the combination with framework, of angle members forming one wall and the top and bottom of a raceway, a shuttle for moving plates in said raceway, and means for operating said shuttle.

In testimony whereof, I have signed this specification in the presence of two subscribing witnesses.

HERMAN FAULKNER.

Witnesses:
  VERNON B. CUTLER,
  GRACE CUTLER.

---

Copies of this patent may be obtained for five cents each, by addressing the "Commissioner of Patents, Washington, D. C."